United States Patent
Lee et al.

(10) Patent No.: US 8,509,072 B2
(45) Date of Patent: Aug. 13, 2013

(54) NETWORK CONGESTION ANALYSIS

(75) Inventors: Yiu Lee, Philadelphia, PA (US); Alain Durand, Great Falls, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 240 days.

(21) Appl. No.: 13/041,927

(22) Filed: Mar. 7, 2011

(65) Prior Publication Data

US 2012/0230186 A1 Sep. 13, 2012

(51) Int. Cl.
*H04L 12/56* (2006.01)
(52) U.S. Cl.
USPC ............ 370/230; 370/235; 370/252; 370/432
(58) Field of Classification Search
None
See application file for complete search history.

(56) References Cited

U.S. PATENT DOCUMENTS

| | | | |
|---|---|---|---|
| 8,139,485 B2 * | 3/2012 | Arseneault et al. | 370/230.1 |
| 2004/0071083 A1 * | 4/2004 | Li et al. | 370/230 |
| 2004/0090918 A1 * | 5/2004 | McLendon | 370/237 |
| 2007/0019549 A1 | 1/2007 | Okabe | |
| 2009/0116458 A1 * | 5/2009 | Ramesh et al. | 370/336 |
| 2010/0265838 A1 | 10/2010 | Yamasaki | |

OTHER PUBLICATIONS

Artur Ziviani: "An Overview of Internet Measurements: Fundamentals, Techniques, and Trends", Mar. 31, 2006, pp. 39-49, XP55028736, p. 43, paragraph C.
Extended European Search Report, EP12154160.1, Dated Jun. 11, 2012.

* cited by examiner

*Primary Examiner* — Chi Pham
*Assistant Examiner* — Shick Hom
(74) *Attorney, Agent, or Firm* — Banner & Witcoff, Ltd.

(57) ABSTRACT

A network monitoring and network congestion analysis can be performed based on a comparison of data packets at multiple different network nodes installed at different locations on a communication path. A downstream network node may be installed at a user location while an upstream network may be installed at an access router further up the network. A network congestion analyzer may receive data packet information including timestamps from both network nodes, and may compare the data packet information to group the data packets into application flows and match the corresponding packets from the different network nodes. Based on the data packet matching, the network congestion analyzer may calculate packet loss, packet delay, packet delay variation, and perform other network congestion analysis techniques for the application flows corresponding to a user's various devices and the applications executing on those devices.

20 Claims, 9 Drawing Sheets

| APPLICATION | Source Port | Dest. Port | Average Mbps | % Mbps | Average Latency | Dropped Packets |
|---|---|---|---|---|---|---|
| Gaming Console 1 | 3074 | 3075 | 0.752 | 12.5 | 124ms | 52 |
| Voice Over IP | 1719 | 1720 | 0.544 | 9.1 | 430ms | 106 |
| Primary Television | 443 | 443 | 0.612 | 10.2 | 76ms | 47 |
| Digital Video (Movie Download Applicat... | 443 | 443 | 2.308 | 38.3 | 110ms | 155 |
| Secondary Television | 25 | 26 | 0.624 | 10.4 | 144ms | 33 |
| Wireless Device 1 | 80 | 80 | 0.032 | .53 | 76ms | 5 |
| Home Computer (Streaming Audio) | 7000 | 7500 | 1.118 | 18.6 | 129ms | 760 |
| Laptop 1 (Internet) | 80 | 80 | 0.010 | .16 | 89ms | 3 |

FIG. 6

NETWORK CONGESTION ANALYSIS

BACKGROUND

Modern network environments often include several different computing devices at an end user's location connected to an external network over a single communication path. For example, a user's home or office may have multiple computers, televisions and set-top boxes, mobile devices, gaming consoles, and other communication devices connected to an interface such as a gateway and/or modem, so that the devices compete for network bandwidth. Users typically purchase a finite amount of upstream and downstream bandwidth from a network provider, and these amounts may be enforced by the user's gateway or other network component. When the combined network usage of the user's devices exceeds the available bandwidth, the user may experience delays and performance degradation on one or more of the devices. However, the user may have no way of determining which network devices are taking up significant amounts of bandwidth at that particular time. Moreover, the user might not even be sure that the performance problems are related to the user's bandwidth limitations. For example, the user may suspect that the performance problems of the devices are caused by congestion further upstream on the network (e.g., at a shared access router, central office, etc.), or by problems within the devices themselves (e.g., hardware malfunctions or software errors).

Thus, although a user may attempt to remedy performance problems, neither the user nor the provider may know the precise cause or location of the performance problems. One attempted solution is for the user to purchase additional bandwidth from the network provider. However, this solution is entirely speculative and will not correct the user's problem if the cause of the problem is within the devices themselves, or if the problem is further upstream on the network. Thus, the user will be reluctant to make the additional purchase without greater assurance that the additional bandwidth will correct the problems with the user's devices. Additionally, if the performance problems are caused by excessive bandwidth usage of one of the user's devices, then simply purchasing more bandwidth will not allow the user to identify the offending device or reconfigure the device to correct the problem.

Accordingly, there remains a need for network monitoring and network congestion analysis techniques that support additional abilities to coordinate growing numbers of user devices and applications that compete for finite network bandwidth.

SUMMARY

Some aspects of this disclosure relate to methods and systems for network monitoring and network congestion analysis based on a comparison of data packets at multiple different network nodes installed at different locations on a network path.

For example, one or more intermediary network nodes may be configured to receive and capture data packets from one or more transmitting nodes, and transmit corresponding data packet information to a network congestion analyzer. A first intermediary network node may be installed on a network path at a user location (e.g., a customer's home or business), while a second intermediary network node may be installed farther upstream on the network path, for example, at an access router or other network component. The intermediary network nodes may be configured to copy and store indentifying characteristics of the data packets transmitted through the network nodes, including timestamps associated with the data packets. The intermediary network nodes may receive a time signal from an external time source in order to synchronize the timestamps created for their respective data packets. After receiving and processing the data packets, the intermediary network nodes may transmit the data packets to their intended destination nodes, and may also transmit the data packet information, including the timestamp data, to the network congestion analyzer.

A network congestion analyzer may be configured to receive data packet information from a plurality of intermediary network nodes, and may identify individual data packets within the data packet information and may group those data packets into application flows corresponding to specific devices, software applications, and/or connections from a user location. Additionally, the network congestion analyzer may match individual data packets received from a first network node (e.g., a downstream network node) with data packets received from a second network node (e.g., an upstream network node), and may compare the timestamps associated with the corresponding data packets to determine network statistics such as packet loss, packet delay, and packet delay variance within the application flows on the network path. The network congestion analyzer may be configured to transmit control instructions to the plurality of intermediary network nodes, for example, to instruct the network nodes to begin capturing data packets, stop capturing data packets, compress and/or filter the data packets based on various properties, and transmit the captured data packets back to the network congestion analyzer.

Data packet matching techniques for different network protocols may be used. For example, a network congestion analyzer may determine that a received data packet is either a Transmission Control Protocol (TCP) or Real-time Transport Protocol (RTP) data packet, and may use the characteristics of the data packet (e.g., source address and port, destination address and port, etc.) along with the TCP or RTP sequence number to identify the data packet and match the packet with a corresponding packet from another intermediary network node. In other examples, the network congestion analyzer may determine that a received data packet is a User Datagram Protocol (UDP) data packet, and may use similar data packet characteristics, along with a hash signature generated based on the UDP packet payload, to identify and match the data packet.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which:

FIG. 6 is an example table showing network data statistics in accordance with some aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
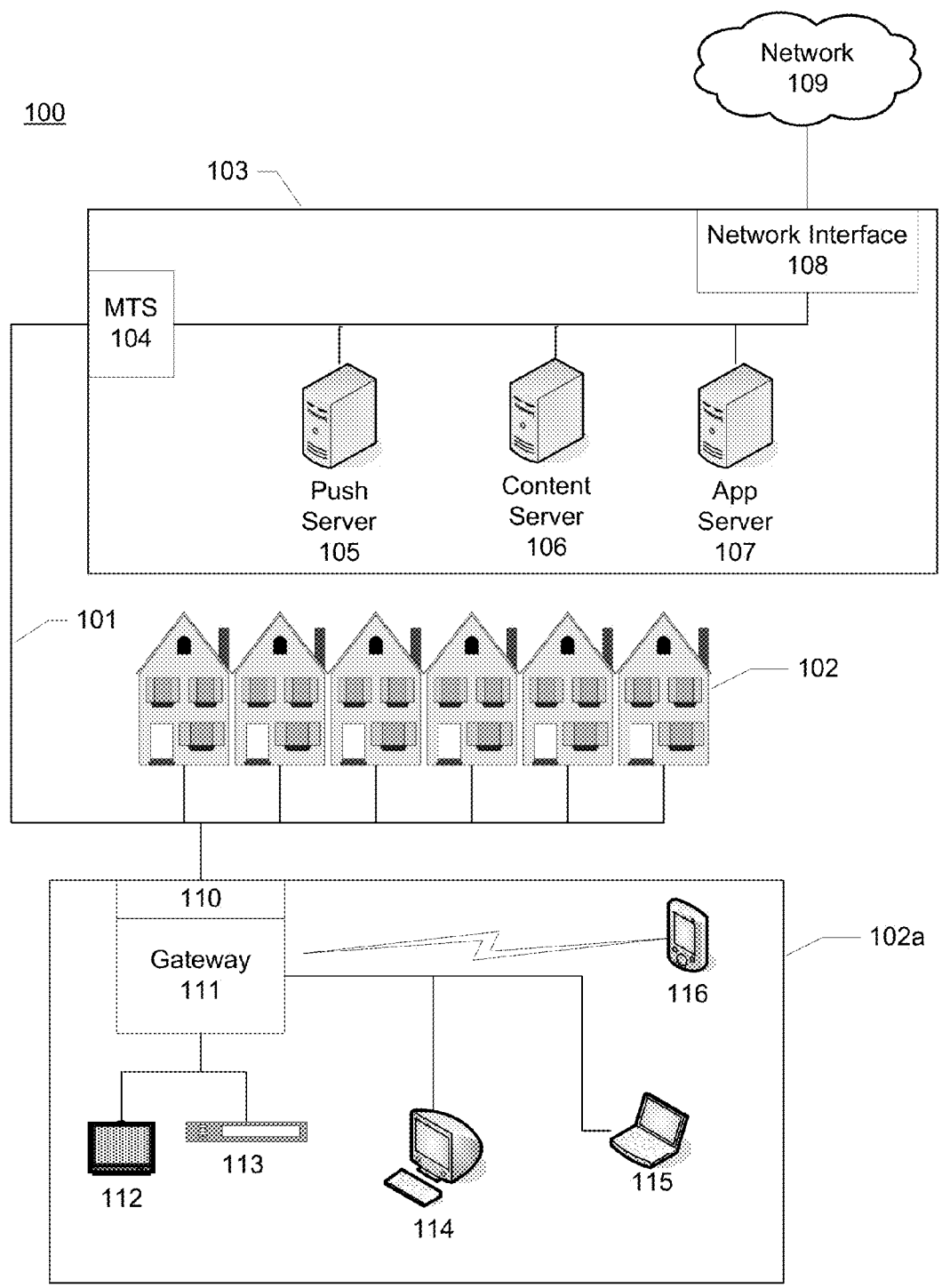
FIGS. 1 and 2 illustrate an example information distribution network on which certain features described herein may be implemented.

FIG. 1 illustrates an example information/content distribution and/or communication network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless, etc.) to connect multiple user locations 102 (e.g., businesses, homes, offices, consumer dwellings, etc.) to a central office or headend 103. The central office 103 may transmit downstream information signals onto the lines 101, and each user locations (e.g., home 102) may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a modem termination system (MTS) 104, such as a cable modem termination system (CMTS) for Cable Modem and DSLAM for DSL, which may be a computing device configured to manage communications between devices on the network of lines 101 and backend devices such as servers 105-107 that transmit network traffic downstream to various homes 102 and receive upstream network traffic from various homes 102 (to be discussed further below). The MTS may be as specified in a standard, such as, in an HFC type network, the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. In certain embodiments, a central office 103 need not be used, and the various homes 102 may communicate with the external networks 109 directly or via one or more network devices (e.g., routers). These networks 109 may include, for example, networks of internet protocol devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. Another application server may be responsible for receiving user remote control commands, and processing them to provide an intelligent remote control experience.

An example home 102a may include an interface, such as a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional set-top boxes (STBs) 113, personal computers 114, laptop computers 115, wireless devices 116 (wireless laptops and netbooks, mobile phones, mobile televisions, personal digital assistants (PDA), etc.), a VoIP Analog Telephone Adapter (ATA), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
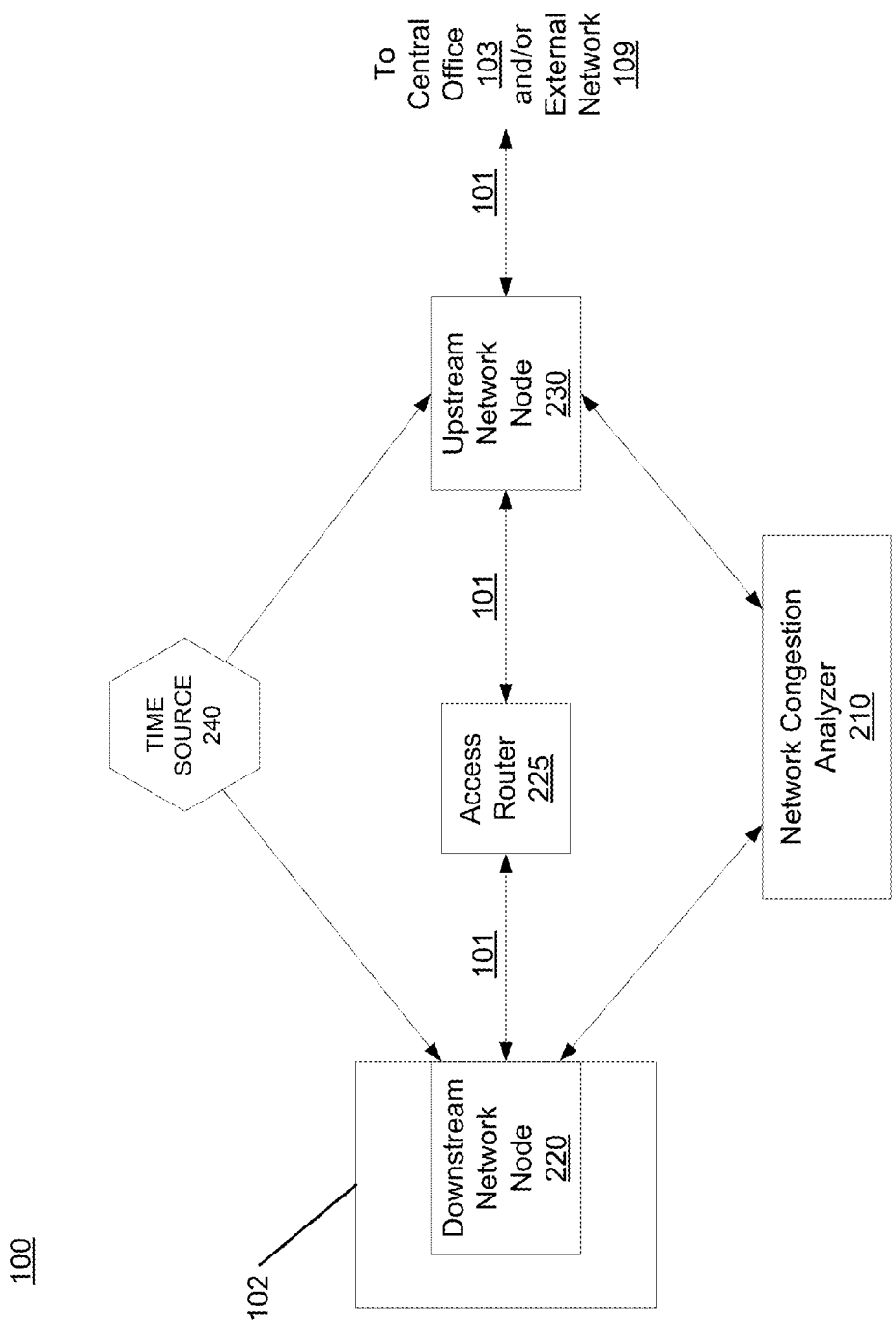

FIG. 2 is another illustration of an example information distribution network 100, including certain additional components on which many of the various features described herein may be implemented. As shown in FIG. 2, a user location 102 (e.g., a user's home, office, business, etc.) may be connected to a central office 103 and/or to an external network 109 via a plurality of intermediary network devices. In this example, the network path 101 between the user location 102 and central office 103 includes a downstream network node 220 (which may or may not be located at user location 102), access router 225, and upstream network node 230. Aspects of the present disclosure relate to network monitoring based on the comparison of network data at the downstream network node 220 and the upstream network node 230. As described in detail below, such comparisons may allow a network operator to identify various application flows of network traffic between a specific device and/or application at a user's location and an external network location. An "application flow" refers to the network traffic along a network path that is associated with a specific device, application, and/or connection.

As discussed above, the network traffic traveling to and from a user location 102 along communication lines 101 may include network traffic from many different devices (e.g., devices 112-116). Further, each device 112-116 may simultaneously execute multiple different software applications that transmit or receive data over the network path 101, and each application may initiate multiple different connections to perform the various tasks of the application. Thus, for example, the network traffic passing through the downstream network node 220 and upstream network node 230 in FIG. 2 may include data packets from an online gaming application executing on a gaming console, data packets of internet protocol traffic sent between a browser application executing on a home computer 114 and a remote web server, data packets of streaming video sent from a content server 106 to a user's set-top box 113 or display device, and so on. The subset of data packets from each of these applications may comprise a separate application flow. In certain embodiments, each data packet passing through the downstream network node 220 and the upstream network node may be associated with a single application flow only. However, in other embodiments, individual data packets and groups of data packets may be associated with multiple different flows. For example, a data packet originating from Application X running on personal computer 114 may be associated with a first application flow, a second application flow may be associated with Application Y running on personal computer 114, a third application flow may be associated with a VOIP call running on an ATA device in the user's home 102a, and so on.

A network congestion analyzer 210 may be configured within the network 100 to receive network data from the downstream network node 220 and upstream network node 230, and use the information to identify and/or reconstruct different application flows of network traffic and perform the network monitoring and network congestion analysis tasks. The functionality and various aspects of the network congestion analyzer 210 and the network nodes 220 and 230 will be described in detail below. Additionally, an external time source 240 may be installed and configured on the network 100 to provide a common time signal to the downstream network node 220 and upstream network node 230. As described below, the common time signal may provide the network nodes 220 and 230 with the ability to record reception times or transmission times associated with specific data packets, thereby allowing the network congestion analyzer 210 to compare the timestamps of data packets when determining packet delay, packet delay variance (or jitter), and other network statistics.

In FIG. 2, the network congestion analyzer 210 and the external time source 240 are shown on a separate network path from the primary communication line 101 between the user's location 102 and the central office 103 and/or external network 109. However, either or both of the network congestion analyzer 210 and the external time source 240 may be installed on the same communication line 101. For example, the network congestion analyzer 210 may be implemented as a network monitoring application executing at the user's home 102, the access router 225, or the central office 103, etc. In other examples, either or both of the network congestion analyzer 210 and the external time source 240 may be located on a remote network and may communicate with the network nodes 220 and 230 via a separate communication network, for example, a separate fiber optic or coax cable network, or a satellite, telephone, or cellular wireless network, etc.

As shown in FIG. 2, the downstream network node 220 may be located at the user's location 102. That is, the downstream network node 220 may be implemented as a separate hardware device installed at the customer's premises 102, in addition to the devices 110-116 shown in FIG. 1. In other examples, the downstream network node 220 may be implemented as additional hardware and/or software integrated within an existing device, such as the gateway 111 and/or modem 110 installed at the user's home 102. For instance, a conventional gateway device 111 or combination gateway-modem device 110-111 may be provided with additional hardware and/or software components to support the functionality of a downstream network node 220 as described herein.

In certain embodiments, it may be advantageous to position the downstream network node 220 downstream of the gateway 111/modem 110 (e.g., between the computing devices 112-116 and the gateway 111/modem 110). For instance, the gateway 111 may be a network address translation (NAT) device which converts the private IP addresses used at the user's location 102 to the public IP addresses used outside the user's location 102. Therefore, by positioning the downstream network node 220 between the gateway 111 and the user's devices 112-116, it may be potentially easier for the downstream network node 220 to identify the devices 112-116 and the applications that are associated with certain data packets.

Additionally, as described above, the user's modem 110 (or another interface device) may be configured to implement a bandwidth restriction on the user's location 102. For example, a user may purchase a predetermined amount of upstream and downstream bandwidth (e.g., 6 Mbps downstream, 2 Mbps upstream) from the network provider, and the modem 110 may enforce that bandwidth restriction by limiting the amount data transmitted between the user's home 102 and the communication network 100, for instance, by dropping or delaying any excess upstream or downstream traffic. Therefore, by positioning the downstream network node 220 downstream of the modem 110, the downstream network node 220 may be able to identify and measure the amount of network traffic flowing to and from the user's devices 112-116 more accurately than a downstream network node 220 positioned upstream of the modem 110. Thus, if the downstream network node 220 is implemented as a separate device, it may be advantageous to position the device downstream of the gateway 111 and/or modem 110. Alternatively, if the downstream network node 220 is implemented as additional hardware and/or software components integrated within the gateway 111 and/or modem 110, then it may be advantageous to position these components within the device so that network node functionality is performed downstream of the gateway and modem functionality.

In certain embodiments, the functionality of the upstream network node 230 may be similar to the functionality of the downstream network node 220, in that both network nodes may be configured to store and transmit similar sets of network data to the network congestion analyzer 210. Therefore, the hardware/software used to implement the upstream network node 230 may be similar to the hardware/software used to the implement the downstream network node 220. However, as shown in FIG. 2, the upstream network node 230 may be positioned at or upstream from an access router 225 that is connected to multiple different users homes 102. Therefore, additional hardware and software components may be used for the upstream network node 230 to support compiling, storing, and transmitting network data associated with many different user homes 102, and/or filtering the network data based on a user's public IP address.

As shown in FIG. 2, the upstream network node 230 may be installed between the access router 225 and the central office 103 and/or external network 109. The upstream network node 230, like the downstream network node 220, may be implemented as a separate network device with specialized hardware and components to perform the network node functionality described herein. In other examples, the upstream network node 230 may be integrated into an existing network device, such as the access router 225 or the central office 103, as additional hardware and/or software components that are configured to compile information based on the network traffic passing through the device and transmit the information to the network congestion analyzer 210.

Although this example shows only a single downstream network node 220 and a single upstream network node 230, additional network nodes and additional techniques for positioning and configuring the network node may be used in other examples. For instance, a downstream network node 220 may be positioned either downstream or upstream from the gateway 111/modem 110 at a user's home 102, and one or more additional downstream network nodes 220 may be positioned downstream, upstream, and/or in between the gateway 111 and modem 110, in order to capture a more complete picture of the user's network traffic. Additionally, although a single upstream network node 230 may be positioned at or near an access router 225, other multiple upstream network nodes 230 may be positioned at other network devices (e.g., other access routers, the central office 103), and additional network nodes may be installed as separate devices at various other points within the communication network 100.

Figure 3:
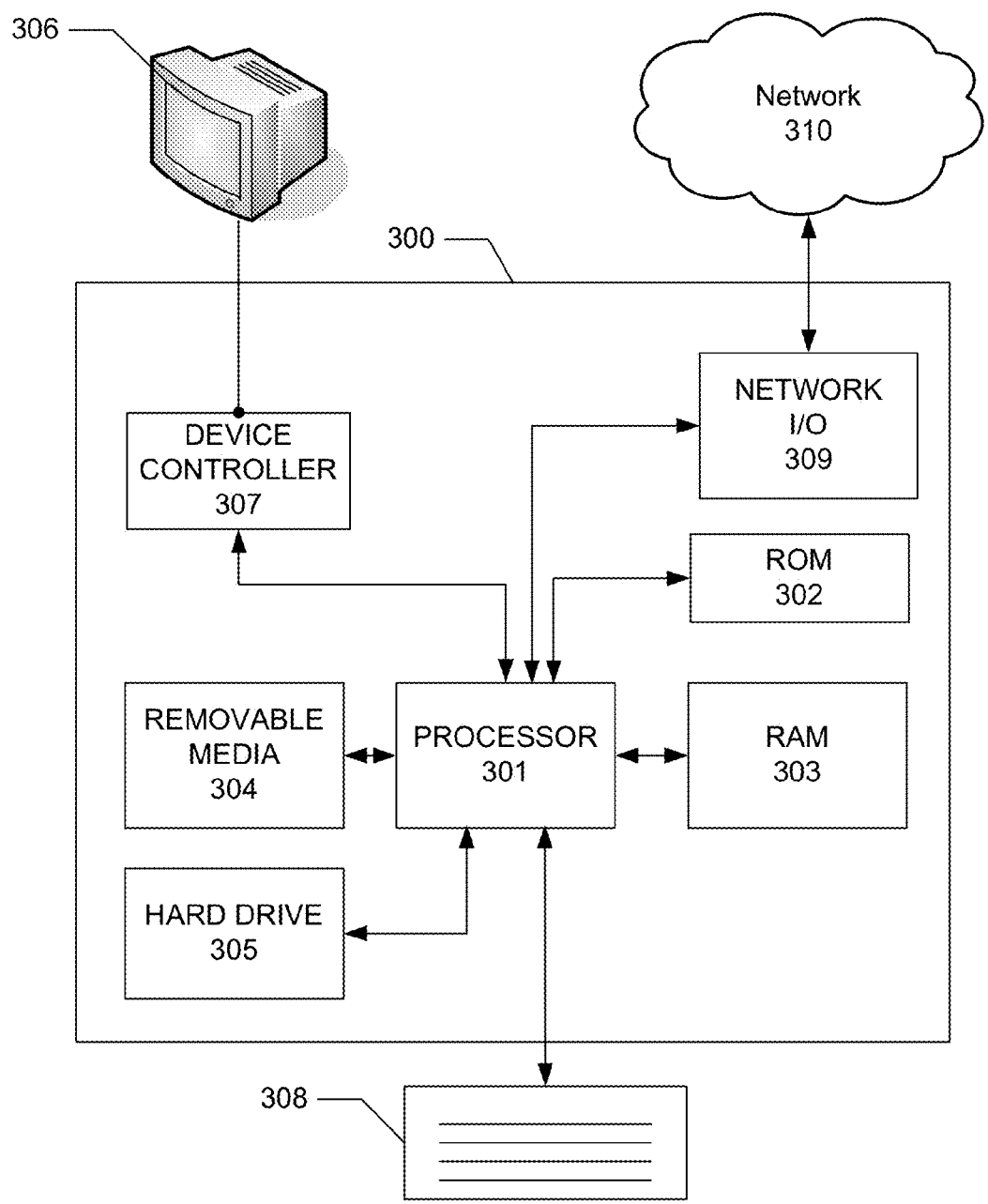
FIG. 3 illustrates an example hardware platform on which certain features described herein may be implemented.

FIG. 3 illustrates general hardware elements that can be used to implement any of the various components/computing devices discussed above. The computing device 300 may include one or more processors 301, which may execute instructions of a computer program to perform any of the features described herein. The instructions may be stored in any type of computer-readable medium or memory, to configure the operation of the processor 301. For example, instructions may be stored in a read-only memory (ROM) 302, random access memory (RAM) 303, removable media 304, such as a Universal Serial Bus (USB) drive, compact disk (CD) or digital versatile disk (DVD), floppy disk drive, or any other desired electronic storage medium. Instructions may also be stored in an attached (or internal) hard drive 305. The computing device 300 may include one or more output devices, such as a display 306 (or an external television), and may include one or more output device controllers 307, such as a video processor. There may also be one or more user input devices 308, such as a remote control, keyboard, mouse, touch screen, microphone, etc. The computing device 300 may also include one or more network interfaces, such as input/output circuits 309 (such as a network card) to communicate with an external network 310. The network interface may be a wired interface, wireless interface, or a combination of the two. In some embodiments, the interface 309 may include a modem (e.g., a cable modem), and network 310 may include the communication lines 101 discussed above, the external network 109, an in-home network, a provider's wireless, coaxial, fiber, or hybrid fiber/coaxial distribution system (e.g., a DOCSIS network), or any other desired network.

Figure 4A:
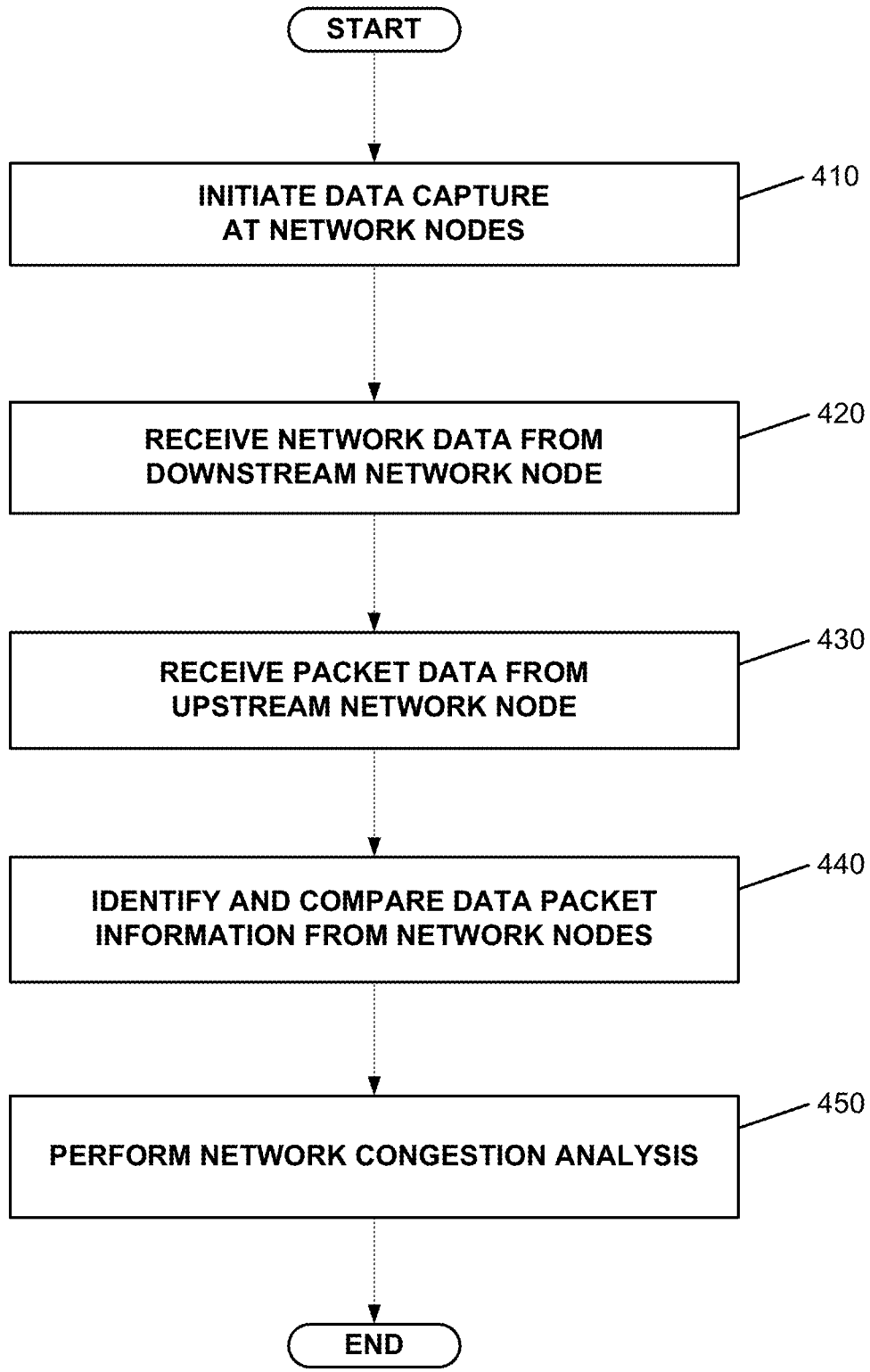
FIGS. 4A-4C are example flow diagrams illustrating methods for receiving data and performing a network congestion analysis in accordance with some aspects of the disclosure.

FIG. 4A illustrates a general example of network monitoring and network congestion analysis techniques performed on a communication/content distribution network 100. The illustrative steps shown in FIG. 4A may correspond to the functional steps performed by a network congestion analyzer 210 in communication with multiple network nodes 220 and 230 in a content distribution network 100.

At step 410, a data capture process is initiated at one or more network nodes in a network 100. For example, referring to the example network 100 shown in FIGS. 1 and 2, the data capture may be initiated by the network congestion analyzer 210 via a signal transmitted to the downstream network node 220 and/or upstream network node 230. The signals transmitted to the network nodes 220 and/or 230 may comprise control instructions, for example, HTTP messages, to instruct the network nodes 220 and 230 to begin "capturing" the data traffic that passes through the nodes. In other examples, a signal from the network congestion analyzer 210 to the network nodes 220 and 230 may be transmitted over a different network path or different network, for example, a separate fiber optic or coax cable network, or a satellite, telephone, or cellular wireless network, etc. One or more of these techniques may be used by the network congestion analyzer 210 to instruct the network nodes 220 and 230 to begin and end a data capture process. In certain examples, the network congestion analyzer may send control instructions to the network nodes 220 and 230 at or near the same time, so that the data captured by the nodes is more likely to contain the same data packets from the same application flows. Additionally, in certain examples, an instruction from a network congestion analyzer 210 to a network node 220 or 230 to begin a data capture process may include a time signal so that the network nodes may synchronize their data capture activities. However, in other examples, the upstream network node 230 and downstream network node 220 may communicate directly with an external time source 240 (as shown in FIG. 2), rather than receiving a time signal from the congestion analyzer 210.

In other examples, the data capture in step 410 need not be initiated by an instruction sent from the network congestion analyzer 210. For instance, the network nodes 220 and 230 may be configured in an "always on" mode so that they are constantly capturing (e.g., copying and storing) data packets passing through the nodes. In this example, the network nodes 220 and 230 may be configured to periodically discard older network data that has not been requested by the network congestion analyzer 210 or any other network component. The network nodes 220 and 230 may also be configured to begin a data capture process according to a predetermined network monitoring schedule. For instance, an automated task may be implemented at each network node 220 and 230 and/or at the network congestion analyzer 210, according to which the network nodes 220 and 230 monitor and capture data from the network regularly (e.g., 5 minutes every hour) as part of an ongoing network monitoring and congestion analysis service offered to a user 102.

As described in greater detail below, when data capture is initiated in step 410, the network nodes 220 and 230 may begin a process of capturing (e.g., observing, copying, storing, and/or analyzing) certain network traffic passing through the node. Therefore, the data captured at a network node 220 or 230 may depend on the location of the network node within the network 100. For example, a downstream node 220 installed at a user's home 102 might only be able to capture the network traffic transmitted to and from the user's home 102, while an upstream node 230 at an access router 225 or other network device may potentially capture network traffic transmitted to and from multiple different user homes 102. Therefore, if a network operator only wants to monitor and analyze the network traffic of a specific user or customer, then the network congestion analyzer 210 may transmit a control instruction to an upstream network node 230 including a parameter that identifies the specific user location 102 to be monitored, thereby allowing to upstream network node 230 to control the data capture process (e.g., by filtering data packets based on the public IP address of the modem 110 at the user's location 102) to capture only the network traffic associated with the specific user.

In step 420, the network congestion analyzer 210 receives network data from the downstream network node 220, and in step 430, the network congestion analyzer 210 receives network data from the upstream network node 230. As discussed above, the network data received in steps 420 and 430 may form the basis for the network monitoring and congestion analysis activities performed by the network congestion analyzer 210 in steps 440 and 450. Thus, it should be understood that steps 420 and 430 need not occur in the order shown in FIG. 2. For example, the network congestion analyzer 210 may receive network data in a single larger transmission from each network nodes 220 and 230, or as multiple periodic transmissions from the nodes.

The network nodes 220 and 230 may transmit the network data to the congestion analyzer 210 according to a predetermined transmission schedule (e.g., every five minutes, every hour, etc.), or in response to a control instruction, for example, a transmit data HTTP control instruction sent by the congestion analyzer 210 to each network node. In other examples, the network nodes 220 and 230 may transmit the network data based on a previous control instruction. For instance, if the network congestion analyzer 210 previously sent a control instruction to the nodes 420 and 430 instructing the nodes to capture network data over a five minute period (in step 410), then the nodes 220 and 230 may be configured to automatically transmit the captured network data to the congestion analyzer 210 at the end of the five minute period (steps 420 and 430). In other examples, the network congestion analyzer 210 may use separate control instructions to control the specific activities of the network nodes 220 and 230. For instance, the network nodes may receive and execute separate control instructions to begin capturing network data, stop capturing network data, report status, filter the captured data (e.g., based on a destination or source address), compress the captured data, and transmit the data to the network congestion analyzer 210.

As discussed above, application flows may be identified or otherwise reconstructed based on the network data received from the network nodes, and identifying/comparing individual data packets received from one network node (e.g., downstream node 220) with the corresponding data packet from another network node (e.g., upstream network node 230). Thus, in certain embodiments, the network data received in steps 420 and 430 may include complete or partial copies of the data packets that have passed through a network node during a time window. The data packets may be in a compressed format to facilitate transmission to the network congestion analyzer 210. However, in other examples, the network congestion analyzer 210 might not need complete copies of the data packets for the identification and comparison in steps 440 and 450. Therefore, the network data received in steps 420 and 430 might not include complete copies of data packets, but may contain a subset of the packet information sufficient to allow the network congestion analyzer 210 to identify and match specific data packets and assign the packets into application flows, for example, source and destination addresses and port numbers, sequence numbers (e.g., for TCP and RTP packets), packet size, and other header and payload data.

The network data received from a downstream network node 220 may be different from the network data received from an upstream network node 230. Because the upstream network node 230 may be located, for example, at an access router 225, the network data received from the upstream node 230 may include network traffic to and from the user 102 as well as network traffic to and from other users. Thus, in some embodiments, before performing the comparing and analysis in steps 440 and 450, the network data may be filtered at one or more of the network nodes 220 and 230, or at the network congestion analyzer 210, so that only network data associated with a particular user location 102 is analyzed in step 450.

Figure 4B:
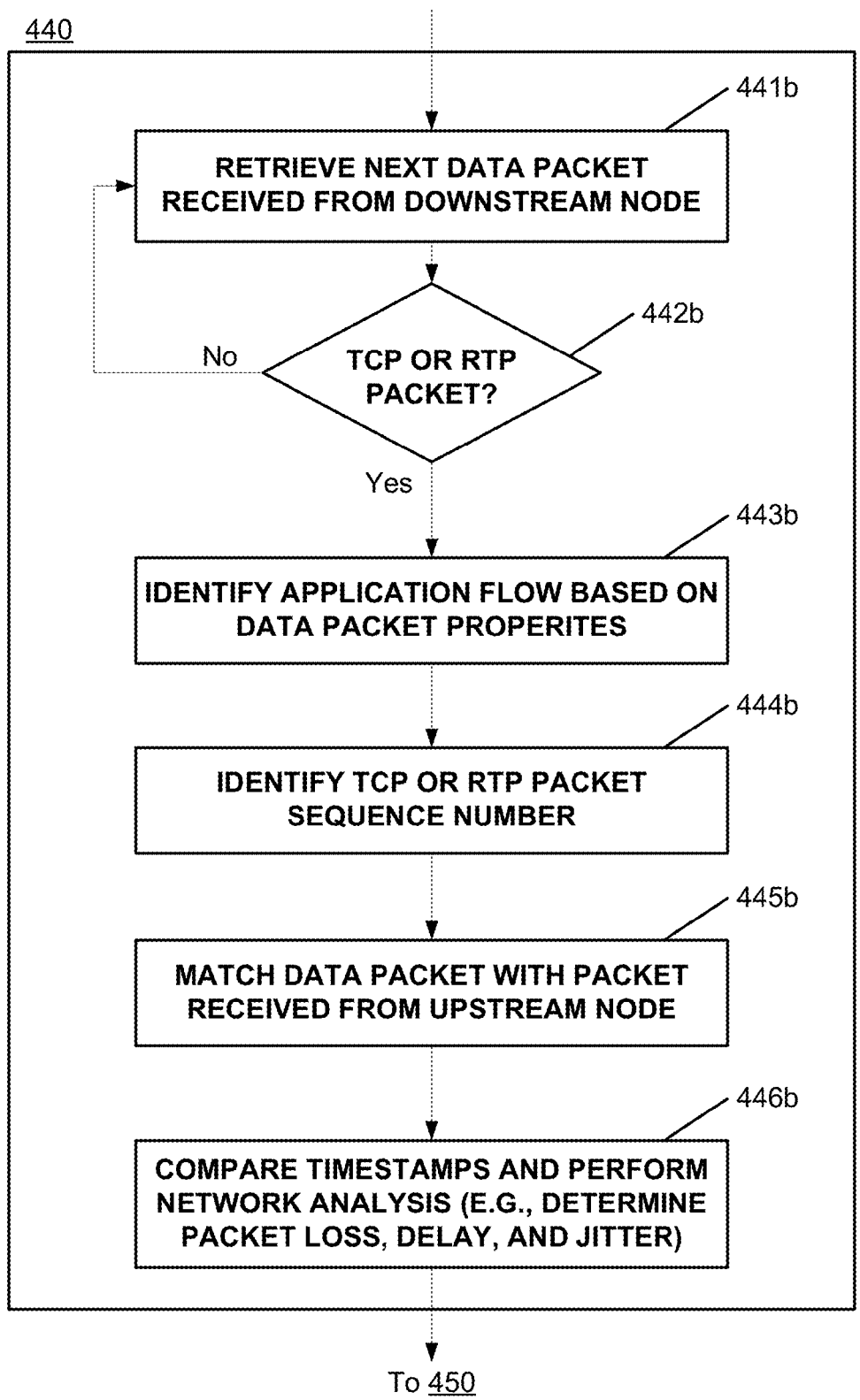
Figure 4C:
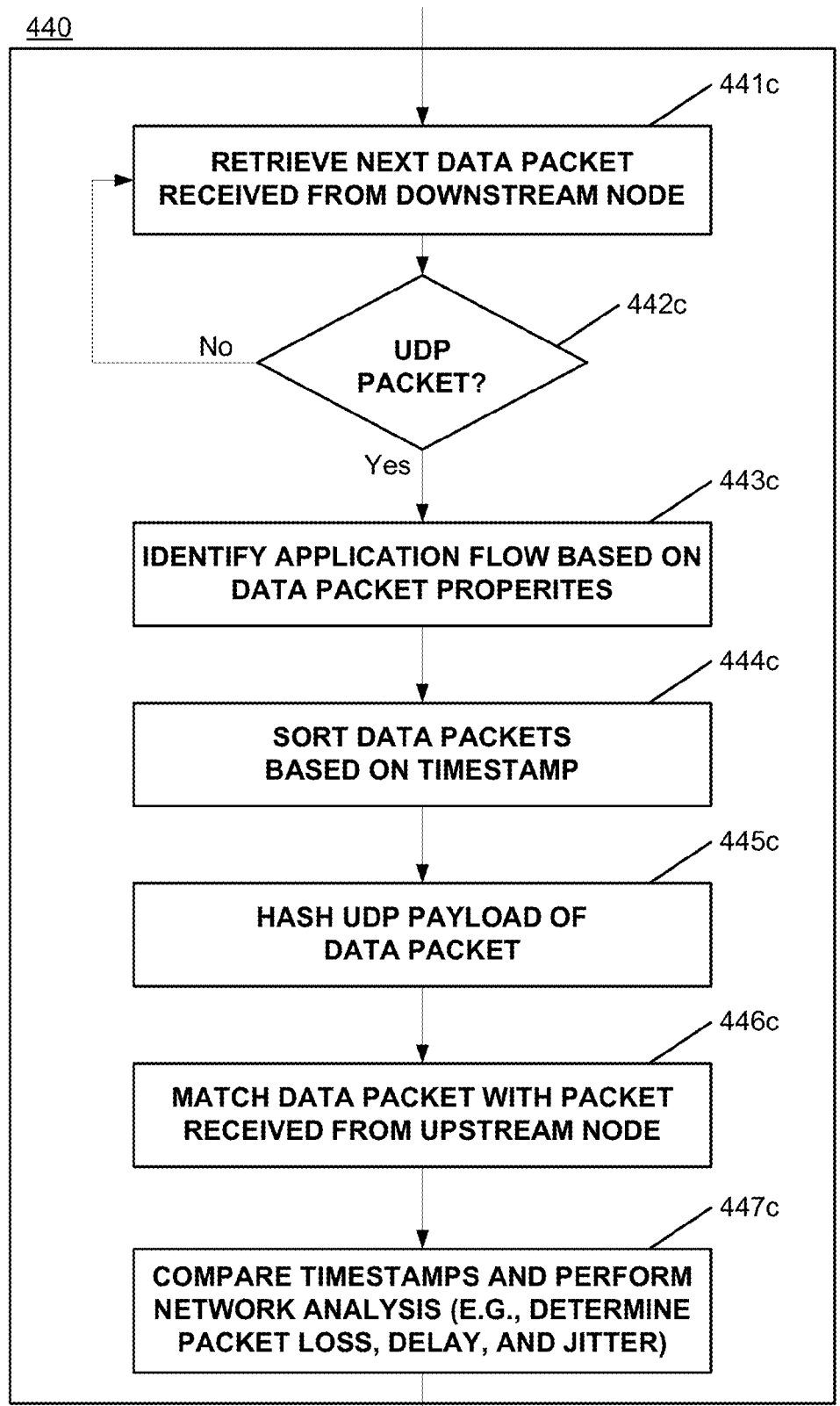

In step 440, the network congestion analyzer 210 identifies and compares the data packet information received from the downstream network node 220 with the data packet information received from the downstream network node 230. The techniques used to identify, compare, and/or match data packets from the different network nodes may vary depending on the type of the data packets received. FIGS. 4B and 4C, described below, illustrate two example techniques for identifying and comparing Transmission Control Protocol (TCP) or Real-time Transport Protocol (RTP) data packets (FIG. 4B), and User Datagram Protocol (UDP) data packets (FIG. 4C). In these examples and others involving different network protocols or data packet types, the data packets received at one network node (e.g., downstream network node 220) may be matched to corresponding data packets received at other network node (e.g., upstream network node 230), based on the matching characteristics or properties of the data packets. In certain examples, the matching process may involve creating (e.g., virtually) one or more data packet tables, or other suitable real or virtual data structures, populated with the properties of the data packets received from one or more network nodes. Table 1, an example data packet table, is shown below to illustrate certain data packet properties that may be stored and compared.

TABLE 1

Sample Data Packet Information Table

| Protocol | Packet ID | Node ID | Source Addr. | Source Port | Dest. Addr. | Dest. Port | Seq. Num. | Hash Sig. | Size | Time Received |
|---|---|---|---|---|---|---|---|---|---|---|
| — | — | — | — | — | — | — | — | — | — | — |

In this example, when processing received data packets, the network congestion analyzer 210 may add a new row to Table 1 for each new data packet received from either of the network nodes 220 or 230. The network congestion analyzer 210 may first assign a unique identifier (Packet ID) to the received data packet, and record from which network node the packet was received (Node ID). The network congestion analyzer 210 may then parse and record several identifying fields of the data packet, for example, the source IP address of the data packet (Source Addr.), the source port (Source Port), the destination IP address of the packet (Dest. Addr.), the destination port (Dest. Port), the sequence number of the packet (Seq. Num) (if applicable), the hash signature of the packet (if applicable), and the packet size (Size). Additionally, although the data packets themselves might not include any time data, the network nodes 220 and 230 may use the external time source 240 (or other time source) to determine a timestamp associated with each data packet and may include the timestamp in the data packet information transmitted in steps 420 and 430. In this example, the network congestion analyzer 210 may parse out and include this timestamp data (Time Received) in Table 1.

As described above, Table 1 may include data packets received from both the downstream network node 220 and the upstream network node 230, may include both upstream and downstream network traffic, and may include network traffic from all of a user's devices 112-116 and all of the various applications and connections established by those devices. However, in other examples, the network congestion analyzer 210 may create different tables (or other data structures) to store different types of data packets and associated information. Separate tables may be created for the data packets received from different network nodes, for upstream and downstream traffic, for different source or destination addresses and ports, and/or for different protocols or packet types, etc. As an example, two tables may be created for each application, an upstream and a downstream table. Thus, for a particular Application X, there may be four total tables: two captured by node 220 and two captured by node 230. Therefore, if a network operator is interested in upstream congestion for Application X, he/she may take the upstream table of Application X from node 220 and compare packet by packet to the upstream table captured by node 230. Based on this comparison, the packet loss, latency and other network characteristics may be measured. The list of data fields in Table 1 is merely illustrative, and various subsets of these data fields and/or additional data fields describing the packets may be used in other examples.

Referring now to FIGS. 4B and 4C, sample processes are shown for identifying and comparing TCP or RTP data packets (FIG. 4B) and UDP packets (FIG. 4C), received from the network nodes. These sample processes in FIGS. 4B-4C may correspond to step 440 in FIG. 4A. In these examples, the sample processes may be performed at the network congestion analyzer 210 by retrieving and processing the data packet information received from the network nodes 220 and 230. In certain examples, the network congestion analyzer 210 may first receive and store the data packet information from the network nodes into a data structure (e.g., Table 1) before performing the processes in FIGS. 4B-4C to identify and compare the data packets. Thus, the sample processes shown in FIGS. 4B-4C may begin by retrieving data from a pre-existing populated data structure at the network congestion analyzer 210 (e.g., Table 1, or a combination of other tables and/or alternative data structures). In other examples, the sample processes shown in FIGS. 4B-4C may receive and process the data packet information in real time, for instance, by receiving the data packet information directly from the network nodes 220 and 230.

Referring now to FIG. 4B, the sample process begins in step 441b by retrieving a data packet from the set of data packets received from a first network node. For example, step 441b may comprise accessing an ordered data structure (e.g., Table 1) stored at the network congestion analyzer 210 and retrieving a row corresponding to a data packet received from the downstream network 220.

In step 442b, the network congestion analyzer 210 determines whether or not the retrieved data packet is a TCP or RTP packet, for example, by reviewing a Protocol field in a data packet table (e.g., Table 1), or accessing a protocol header or the payload data within the data packet itself. If the packet is not a TCP or RTP packet (Step 442b: No), then the sample process in FIG. 4B is not the appropriate process for the data packet, and the process returns to step 441b to await the retrieval of another data packet. However, if the data packet is identified as a TCP or RTP packet (Step 442b: Yes), then the process may proceed to step 443b to identify one or more application flows corresponding to the data packet. As discussed above, an application flow is a set of data packets transmitted over a network path 101 that may be associated with specific network traffic, software applications and/or connections at a specific device 112-116 at a user location 102.

In step 443b, the network congestion analyzer 210 may retrieve certain properties from the data packet, such as the source IP address, source port, destination IP address, destination port, and IP protocol number (e.g., UDP, TCP), in order to determine the application flow(s) that include the data packet. In certain embodiments, the network congestion analyzer 210 may access a reference table listing commonly used port numbers, IP addresses, and protocols, etc., along with associated device and application identifiers, to allow the network congestion analyzer 210 to identify the application flow of a data packet. For example, if the network congestion analyzer 210 retrieves a data packet transmitted from port 1719, it may determine by accessing a port/application table that a certain voice-over-IP (VOIP) application uses ports 1719 and 1720 for its network traffic.

As discussed above, a downstream network node 220 may be installed downstream of a network address translation (NAT) device (e.g., gateway 111) installed at the user's location 102, so that the IP address of the user's device 112-116 will be a private IP address that identifies the device itself. In other examples, if the downstream network node 220 is installed upstream of a NAT device, then the IP address of the device recorded in the data packet may be a translated public IP address that identifies the user's modem 110 or gateway 111.

Also in step 443*b*, the network congestion analyzer 210 may identify multiple data packets as part or members of the same application flow. For example, after determining an application flow of a first data packet, the network congestion analyzer 210 may assign an application flow identifier to the data packet and/or may store the data packet in a separate table dedicated to the application flow. Additionally, the network congestion analyzer 210 may identify the correct application flow for subsequent data packets by matching certain properties with other data packets that have been previously analyzed and assigned to an application flow.

After determining the application flow of the data packet in step 443*b*, the TCP or RTP sequence number of the data packet is identified is step 444*b*. Using the sequence number of the data packet, the network congestion analyzer 210 may then organize the data packets of the application flow according to their sequence numbers to facilitate the packet matching and analyses performed in subsequent steps.

In step 445*b*, the network congestion analyzer 210 matches the data packet from the first network node (e.g., the downstream network node 220) with a corresponding data packet from the second network node (e.g., the upstream network node 230). As discussed above, matching data packets may be identified by certain similar properties, such as the same source and/or destination address, the same source and/or destination port, and the same sequence number. However, there are instances when these properties might not always match in the corresponding data packets from different network nodes. For instance, if the network nodes are positioned on opposite sides of a NAT device or other network component that alters or repackages network traffic, then a subset of these data packet properties and/or additional properties may be used to match the data packets. Additional techniques that may be used to match the data packets between different network nodes may include, for example, matching the payload size, payload hashing techniques, and matching data packets that have approximately (although not exactly) the same timestamp at the different network nodes. Table 2, shown below, is a sample downstream network traffic table containing two matching data packets from a downstream network node 220 and an upstream network node 230.

TABLE 2

Sample Matching TCP Data Packets

| Protocol | Packet ID | Node ID | Source Addr. | Source Port | Dest. Addr. | Dest. Port | Seq. Num. | Size | Time Received |
|---|---|---|---|---|---|---|---|---|---|
| TCP | 123 | 220 | 1.2.3.4 | 80 | 5.6.7.8 | 80 | 18 | 220B | 01:35:07.478 |
| — | — | — | — | — | — | — | — | — | — |
| TCP | 456 | 230 | 1.2.3.4 | 80 | 5.6.7.8 | 80 | 18 | 220B | 01:35:08.056 |

In step 446*b*, the network congestion analyzer 210 compares the timestamps of matching data packets from the downstream and upstream network nodes 220 and 230 in order to perform network analysis tasks, such as determinations of packet loss, packet delay, and packet delay variation (or jitter). As mentioned above, the downstream and upstream network nodes 220 and 230 may be synchronized, for example, by receiving a common time signal from an external time source 240. Thus, the difference in timestamps in matching data packets may represent the network path transmission time between the network nodes 220 and 230 with a high degree of accuracy.

In sample Table 2, the matching data packets 123 and 456 have a timestamp difference of +0.578 seconds, indicating that this data packet is being transmitted upstream (e.g., from a user's device 112-116 to the central office 103 or external network 109), and has a packet delay of 0.578 seconds. In other examples, if a matching data packet is not found in step 445*b*, the network congestion analyzer 210 may conclude that the data packet was dropped in between the network nodes 220 and 230. Accordingly, in step 446*b*, the network congestion analyzer 210 may increment a packet loss counter to reflect the dropped packet in this application flow. Additionally, packet delay variation, or jitter, refers to differences in packet delay between data packets in the same flow. Packet delay variation may result in packets being received out of order at or one both of the network nodes 220 and 230. Packet jitter may be detected by identifying out of order sequence numbers in the received packets, or by comparing the packet delay (e.g., the difference in timestamps) of multiple different packets in the same flow. After a significant number of data packets from an application flow have been received and analyzed, the network congestion analyzer 210 may use any of several well-known statistical techniques (e.g., variance) to calculate the packet jitter for the application flow.

Referring now to FIG. 4C, a sample process is shown similar to the process shown in FIG. 4B. However, the process shown in FIG. 4C is configured to retrieve and analyze UDP data packets, rather than TCP and RTP packets as discussed above. Although several steps of these processes are similar, UDP packets do not include sequence numbers or any other information to allow the network congestion analyzer 210 to determine the packet sequence. Accordingly, the sample process of FIG. 4C includes a hashing step (445*c*) to generate a unique packet identifier that may be matched with the data packets from other network nodes.

In step 441*c*, as in the previous example, the process executing on the network congestion analyzer 210 retrieves a data packet from the set of data packets received from the downstream network node 220. In step 442*c*, the network congestion analyzer 210 determines whether or not the retrieved data packet is a UDP packet, for example, by reviewing a Protocol field in a data packet table (e.g., Table 1), or accessing a protocol header or payload data within the data packet itself to determine the network protocol of the packet. If the packet is not a UDP packet (Step 442*c*: No), then the sample process in FIG. 4C is not the appropriate process for the data packet, and the process returns to step 441*c* to await another the retrieval of another data packet. However, if the data packet is identified as a UDP packet (Step 442*c*: Yes), then the process may proceed to step 443*c* to identify one or more application flows corresponding to the UDP data packet using techniques similar to those discussed above in reference to step 443*b*.

In step 444c, the network congestion analyzer 210 may sort the data packets in the UDP application flow based on the timestamp associated with the data packets. As mentioned above, UDP data packets do not include a sequence number. Therefore, sorting data packets based on their timestamps (e.g., the times the network packets were received at the downstream network node 220) may be used a preferred approximation of packet sequence in this example. However, other sorting methods based on other data packet properties may be used. Additionally, in certain examples, the sorting step 444c need not be performed, for instance, if the packets are captured in sequence order.

In step 445c, the network congestion analyzer 210 performs a hash function (e.g., an MD5-Hash excluding the UDP source port and source IP address) on the data packet received from the downstream network node 220, and generates a hash signature for the data packet. Thus, in this example, both network nodes 220 and 230 would likely transmit full copies of the data packets, including their entire payloads, to the network congestion analyzer 210 to allow for the hashing function. However, in other examples, the hashing function may be performed by the network nodes 220 and 230 before transmission, rather than by the network congestion analyzer 210 after transmission. In these examples, the network nodes 220 and 230 might only transmit hash signatures to the network congestion analyzer 210 rather than transmitting the entire payload of the data packets. In any case, depending on the hash algorithm used, the hash signature generated in step 445c may be unique among other data packets in the application flow with a high degree of confidence. These hash signatures may be stored at the network congestion analyzer 210 and associated with their respective data packets, for example, as a data field in Table 1.

In step 446c, the network congestion analyzer 210 matches the data packet from the first network node (e.g., the downstream network node 220) with a corresponding data packet from the second network node (e.g., the upstream network node 230). In this example, the matching may be performed by matching a hash signature from a data packet received from the downstream network node 220 with the same hash signature from a data packet received from the upstream network node 230. Additionally, as discussed above in reference to step 445b, other data fields and data packets may be used to match the data packets from different network nodes, such as the source and destination addresses and ports, packet size, protocols, timestamps, and other header information. Table 3, shown below, is a sample table containing two matching UDP data packets from a downstream network node 220 and an upstream network node 230.

indicating that this data packet is being transmitted downstream (e.g., from the central office 103 or external network 109 to a user's device 112-116), and has a packet delay of 0.043 seconds. Step 447c may also include determinations of packet loss, packet delay and packet delay variation (or jitter) of UDP packets and UDP application flows may be performed using well-known statistical analysis techniques.

Returning now to FIG. 4A, in step 450 the network congestion analyzer 210 may perform additional network monitoring and/or a network congestion analysis based on the earlier analyses performed in step 440. As discussed above, the congestion analysis may include analyzing downstream network congestion (using traffic from the upstream network node 230 as a reference point) and/or analyzing upstream network congestion (using traffic from the downstream network node 220 as a reference point). Additionally, the different analyses in steps 440 and 450 may correspond to different scopes of network traffic. For instance, step 440 may include analyses of individual data packets and individual application flows, such as determinations of packet loss and calculations of packet delay and packet delay variation, while step 450 may include one or more analyses of the multiple application flows and/or multiple devices in a user's location (e.g., customer's home) 102. Thus, an analysis in step 450 may compare the amount of upstream and/or downstream bandwidth being used by the various applications (e.g., VOIP applications, gaming console applications, mobile devices, video streaming applications, televisions, computers, set-top boxes, etc.) at the customer's home 102.

Figure 5:
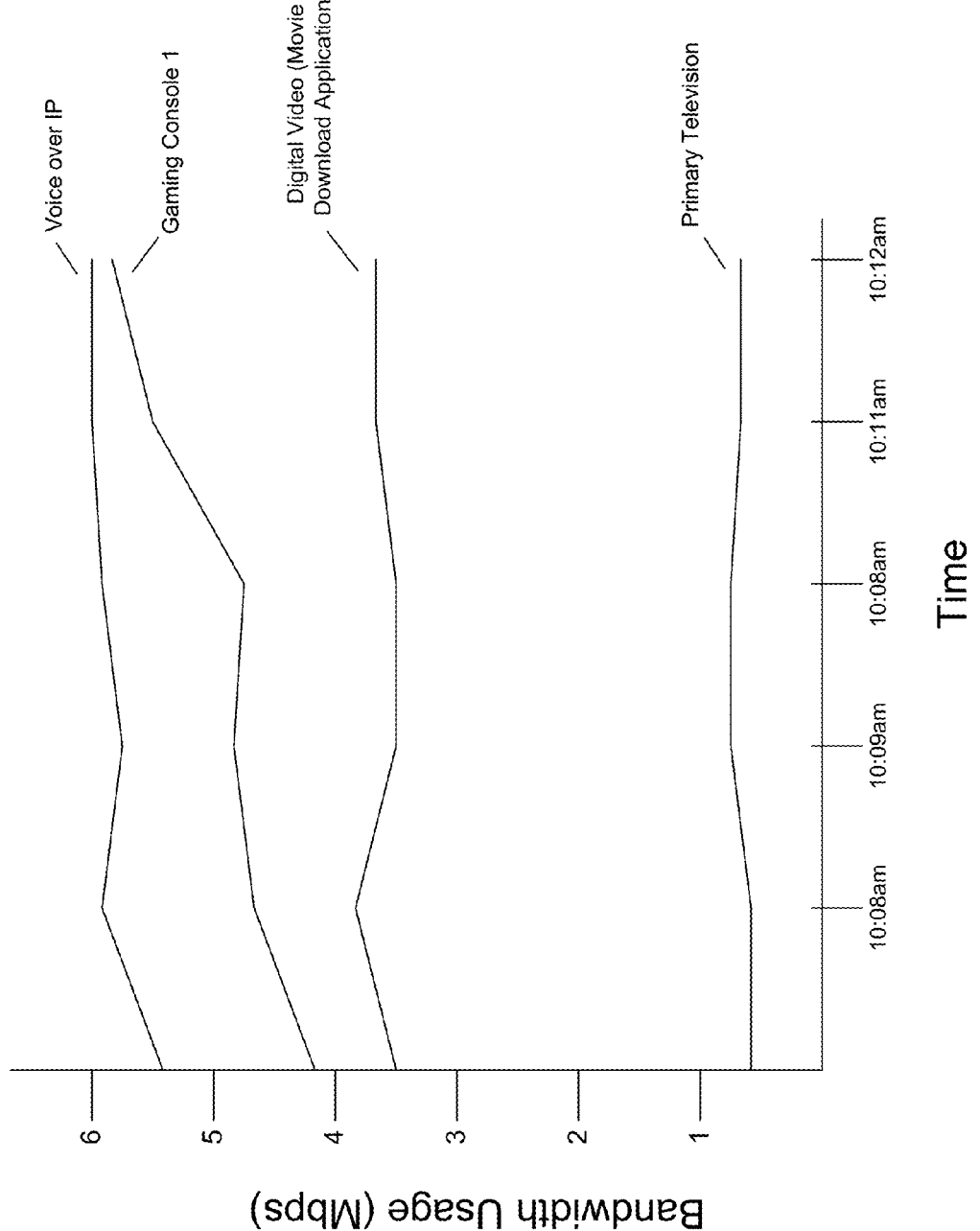
FIG. 5 is an example graph showing bandwidth usage in accordance with some aspects of the disclosure.

FIG. 5 illustrates a sample graph showing one type of network congestion analysis that may be performed in step 450. The five-minute time window shown in this graph indicates that the downstream and upstream network nodes 220 and 230 may have received control instructions to begin capturing data from 10:07 am to 10:12 am. In this example, after the data capture process, the transmission of data to the network congestion analyzer 210, and the subsequent analysis, the network congestion analyzer 210 has generated a chart displaying the bandwidth usage of four different application flows: a primary television 112 in the user's home 102 receiving television programming from a content server 106; a digital video application downloading movies from the central office 103 (e.g., to the user's set-top box 113 or personal computer 114); a gaming console application communicating with an external network 109 for online gaming; and a voice over IP (VOIP) application (e.g., executing on the user's desktop computer 114 or laptop 113). In this example, the graph shown in FIG. 5 may correspond to the user's downstream network traffic only, and a separate graph (not shown)

TABLE 3

Sample Matching UDP Data Packets

| Protocol | Packet ID | Node ID | Source Addr. | Source Port | Dest. Addr. | Dest. Port | Hash Sig. | Size | Time Received |
|---|---|---|---|---|---|---|---|---|---|
| UDP | 222 | 220 | 4.3.2.1 | 443 | 8.7.6.5 | 443 | a48ef2 | 865B | 02:57:27.045 |
| UDP | 333 | 230 | 4.3.2.1 | 443 | 8.7.6.5 | 443 | a48ef2 | 865B | 02:57:27.002 |

In step 447c, the network congestion analyzer 210 compares the timestamps of matching data packets from the downstream and upstream network nodes 220 and 230 in order to perform network analysis tasks, such as determinations of packet loss, packet delay, and packet delay variation (or jitter). In sample Table 3, the matching UDP data packets 222 and 333 have a timestamp difference of −0.043 seconds, may be generated for the user's upstream traffic. If the user in this example has purchased 6 Mbps of downstream network bandwidth, then the graph in FIG. 5 may indicate that the user is using most or all of its allotted downstream bandwidth and certain of the user's devices 112-116 may be experiencing packet loss and/or delay. It should be understood that graphs, such as the example shown in FIG. 5, may be virtual and may take any form within the network congestion analyzer 210. Such graphs also may be output to any display device or other output connected to the analyzer 210.

Based on graphs like the example shown in FIG. 5, users or providers may decide how best to manage their devices and network resources. For example, the user may reconfigure certain applications (e.g., movie downloading for future viewing) to run at non-peak times, or may turn off certain devices while running certain applications on other devices that require a high level of network quality (e.g., a VOIP or video conference call). In other examples, users may review their bandwidth usage graphs and see that they have additional unused bandwidth at certain times, and therefore may configure their applications or devices (or install new applications or devices) to use the available bandwidth. In still other examples, users may see from their bandwidth usage graphs that they have purchased the wrong amount of upstream and/or downstream bandwidth for their preferred devices and applications. Accordingly, some users may decide after reviewing their usage graphs and statistics that they need more bandwidth for their preferred devices and applications, or that they do not need as much bandwidth as they have purchased, and thus the user may change their bandwidth purchase plan as desired.

FIG. 6 illustrates another example of a network congestion analysis that may be performed in step 450 of FIG. 4. In FIG. 6, a chart is shown displaying network traffic statistics for a plurality of devices/applications operating at a user's home 102. As discussed above, each device 112-116 at a user location 102 may execute one or more applications that correspond to application flows. In this example, the Application field 601 is populated with a device and/or application name that may be readily identifiable to a user or network operator when analyzing the usage data. The Source Port field 602 and Destination Port field 603 identify the source and destination ports used by the device/application to transmit and receive network traffic. The Average Mbps field 604 contains a calculation of the average amount of bandwidth (e.g., either upstream or downstream) used by the application over the measured time window, and the % Mbps field 605 corresponds to the percentage of the user's overall bandwidth usage that the application represents. As in the above example, the chart in FIG. 6 may correspond to a user's downstream network traffic. Also, as shown in the measured time window the user may be using all or most of a 6 Mbps purchased downstream bandwidth allotment. The sample chart in FIG. 6 also includes an Average Latency field 606 showing the average network path transmission time between the downstream network node 220 and the upstream network node 230 for each application. Additionally, FIG. 6 includes a Dropped Packets field 607 indicating the number of dropped packets in the application flow (or applications flows) for the application during the measured time window.

Based on the data in FIG. 6 and other related information, users and network operators (e.g., network providers) may be able to determine network usage and measure network quality for various devices and applications executing in a user's home 102. For example, users may submit complaints to a network operator based on network delays or performance degradations for one or more of the user's devices 112-116 and/or applications. In response to the complaint, the network operator may direct the network congestion analyzer 210 and network nodes 220 and 230 to perform a data capture and analysis as described above. Then, using the statistics and analyses shown in FIGS. 5 and 6, the network operator or the user may assess the level of network usage for the user's devices, identify the causes of any network delays or performance degradations, and may suggest possible solutions to any network congestion problems.

Figure 7:
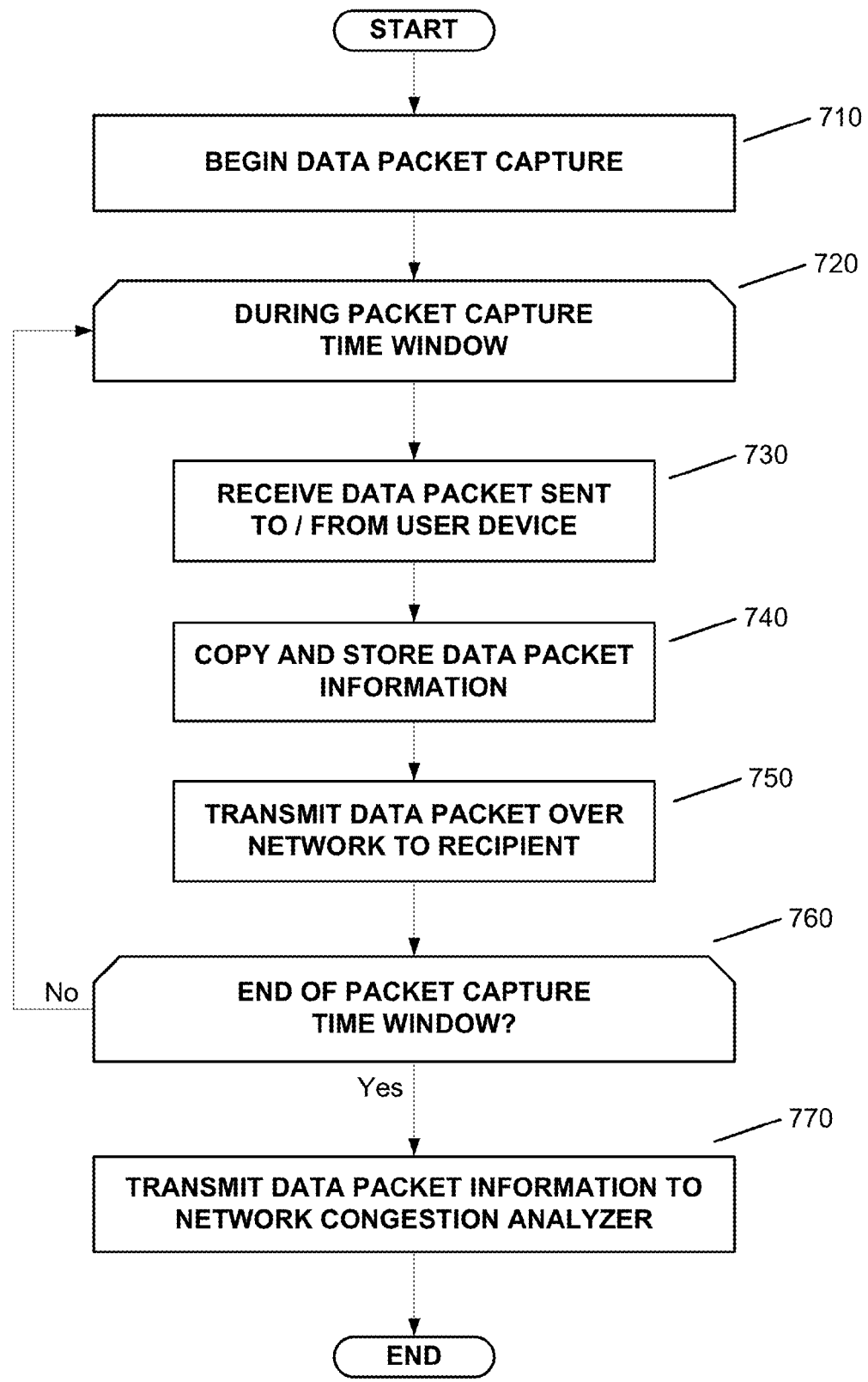
FIG. 7 is example flow diagram illustrating a method for receiving data packets and transmitting data packet information in accordance with some aspects of the disclosure.

FIG. 7 illustrates a general example of a method for receiving data packets and transmitting data packet information on a network 100. As discussed above, the illustrative steps shown in FIG. 4A were described as functional steps that may be performed by a network congestion analyzer 210. However, the data packets may be first received and processed by one or more network nodes installed on the communication lines 101. Additionally, in certain examples, some (or all) of the data packet processing and network congestion analysis may be performed at the network nodes. Accordingly, the illustrative steps shown in FIG. 7 may correspond to the functional steps performed by one or more network nodes in the network 100, for example the downstream network node 220 and upstream network node 230 shown in FIG. 2.

In step 710, the network node (e.g., downstream network node 220 or upstream network node 230) may receive a control instruction to begin capturing data packets transmitted over the communication lines 101. As discussed above in reference to FIGS. 4A-4C, a network congestion analyzer 210 may send a control instruction (e.g., an HTTP message) to the network nodes 220 and 230 to command the nodes to begin capturing data packets. Such an instruction may be based on a user request, for example, from a network operator or a user interested in monitoring and analyzing network traffic.

Although this example involves a control instruction, it should be understood that additional techniques may be used initiate the data packet capture process at a network nodes 220 and 230. For example, as discussed above, the network nodes 220 and 230 may continuously capture data packets, or may capture packets according to a predetermined schedule, etc.

In step 720, the process executing at a network node 220 or 230 enters a control loop for a specific time window during which the network node will capture data packets as they are transmitted along the communication lines 101. In other examples, the data packet capture process in FIG. 7 need not be based on a predetermined time window. For instance, the data packet capture process may be configured to exit after capturing a certain number of data packets, or may be configured to start and stop capturing data packets only in response to control instructions received from the network congestion analyzer 210 or other component. Additionally, if a user or network operator is only interested in analyzing a particular aspect of network congestion, then during the data packet capture process beginning in step 720 the network nodes 220 and 230 may be configured to capture only certain types of data packets. For example, a control instruction received from the network congestion analyzer 210 may include parameters specifying that only data packets with the specified protocol(s), source address(es), destination(s), port(s), etc., should be captured by the network node. For instance, if a network operator wishes to analyze a user's downstream network traffic and is not interested in the user's upstream network traffic, then the network nodes 220 and 230 may be configured to only capture downstream traffic (e.g., data packets having a destination address corresponding to one or the devices in the user's home 102).

Steps 730-750 correspond to steps that may be implemented within the data packet capture process. In step 730, a network node 220 or 230 receives a data packet and determines that the data packet is being sent to or from a device 112-116 in the user's home 102. In step 740, a network node 220 or 230 stores information describing the received data packet, for example, in a local memory at the network node. In some examples, the network nodes 220 and 230 may copy the entire data packet, while in other examples it may be sufficient for the network nodes to copy only a subset of the data packet fields and/or payload. For example, as discussed below, any header fields or other portions of the data packet that will not be used to match the data packet with a corresponding packet from a different network node need not be stored at the local network node in step 740. Additionally, the network nodes 220 and 230 may store a timestamp in step 740 associated with each stored data packet. As discussed above, data packet timestamps may be generated by the network nodes 220 and 230 to reflect the time the data packets arrived at the network nodes, using a time signal from an external time source 240 synchronized with the other network nodes.

In step 750, a network node 220 or 230 transmits the data packet in its original form over the communication pathway 101 to its intended recipient. Thus, even though the data packets received by the network nodes 220 and 230 during the capture process may be read, parsed, copied, and/or stored, these steps need not affect the delivery of the original unaltered packets to their intended recipients. In some instances, network delays may occur as a result of the additional tasks performed in steps 730 and 740, therefore, it may be advantageous to minimize the amount of processing required until after the data packet has been transmitted in step 750. For instance, the processing tasks such as searching the data packets for specific fields and/or criteria, parsing out certain data fields, and compressing the data packets, may be postponed until after step 750 for performance reasons in certain embodiments.

In step 760, at the end of the data capture time window, the data capturing process executing at the network node 220 or 230 terminates and the network node ceases capturing data packets. As discussed above, in other examples, step 760 might not correspond to the end of a time window, but may instead correspond to the end of a predetermined number of packets to be captured, or to another control instruction received by the network node 220 or 230 instructing the node to stop the data packet capturing process.

In step 770, the network node 220 or 230 transmits the data packet information collected in the previous steps to the network congestion analyzer 210. As discussed above, this data packet information may include complete copies of each of the data packets received at the network node during the time window and a timestamp associated with each packet. Alternatively, the data packet information may include only a subset of the data fields, for example, by removing any extraneous data fields that will not be used by the network congestion analyzer 210. For instance, in certain embodiments, the network congestion analyzer 210 might not use the packet payload at all when matching, comparing, and analyzing the data packets and application flows. In this example, the network nodes 220 and 230 may strip out the payload information prior to transmission. Any data packet header fields that are not used for the matching and comparing processes described in FIGS. 4A-4C might also be stripped out from the data packet information before transmitting in step 770. Additionally, the network nodes 220 and 230 may employ any of several well-known data compression techniques to further compress the data packet information before transmission. Finally, the data packet information and timestamp data are transmitted to the network congestion analyzer 210, so the congestion analyzer can perform the data packet identification, matching, and application flow congestion analysis described above in reference to steps 440-450.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method, comprising:
    receiving, at a network data flow analyzer, data corresponding to a first plurality of data packets associated with a first network element, and data corresponding to a second plurality of data packets associated with a second network element;
    identifying in the first plurality of data packets a first data packet having first identifying information;
    identifying a second data packet, in said second plurality of data packets, having second identifying information corresponding to said first identifying information; and
    performing a network data flow analysis for a network path comprising the first network element and the second network element, wherein performing the network data flow analysis comprises comparing the first identifying information with the second identifying information, and determining that the first data packet and the second data packet correspond to the same data packet at different locations in the network path.

2. The method of claim 1, wherein the first identifying information comprises a first timestamp and the second identifying information comprises a second timestamp, and wherein performing the network data flow analysis comprises comparing the first timestamp and the second timestamp.

3. The method of claim 1, wherein the received data corresponding to the first plurality of data packets corresponds to network data collected downstream of an access modem, and the received data corresponding to the second plurality of data packets corresponds to network data collected upstream of the access modem.

4. The method of claim 1, wherein the first data packet and the second data packet are Transmission Control Protocol (TCP) packets or Real-time Transport Protocol (RTP) packets, and wherein determining that the first data packet and the second data packet correspond to the same data packet comprises comparing a packet sequence number from the first data packet to a packet sequence number from the second data packet.

5. The method of claim 1, wherein the first data packet and the second data packet are User Datagram Protocol (UDP) packets, and wherein determining that the first data packet and the second data packet correspond to the same data packet comprises:
    determining a first hash signature associated with a payload of the first data packet;
    determining a second hash signature associated with a payload of the second data packet; and comparing the first hash signature and the second hash signature.

6. The method of claim 1, wherein performing the network data flow analysis comprises:
   identifying a plurality of application flows on the network path; and
   determining an amount of network usage for each of the plurality of application flows.

7. The method of claim 6, wherein performing the network data flow analysis further comprises calculating at least one of an amount of packet delay, an amount of packet delay variation, or a number of dropped packets for each of the plurality of application flows on the network path.

8. A method, comprising:
   receiving, by an intermediary network node, a plurality of data packets transmitted by one or more transmitting nodes to one or more destination nodes;
   storing, by the intermediary network node, a first data set corresponding to the plurality of data packets, said first data set comprising one or more data fields identifying characteristics of the plurality of data packets;
   transmitting, by the intermediary network node, the plurality of data packets to the one or more destination nodes; and
   transmitting, by the intermediary network node, the first data set to a network congestion analyzer.

9. The method of claim 8, wherein storing the first data set is performed based on a control instruction received from the network congestion analyzer to begin capturing data packets.

10. The method of claim 8, wherein the received plurality of data packets comprises data packets corresponding to a plurality of different application flows, each said application flow associated with one of the transmitting nodes.

11. The method of claim 8, further comprising compressing the first data set before transmitting the first data set to the network congestion analyzer.

12. The method of claim 8, further comprising:
    receiving a signal from an external time source;
    creating a timestamp associated with a first data packet in the plurality of data packets, said timestamp based on the external time source and based on a time that the first data packet was received at the intermediary network node; and
    storing the timestamp as a data field within the one or more data fields identifying the characteristics of the plurality of data packets.

13. The method of claim 8, further comprising:
    determining that a first data packet in the received plurality of data packets is one of a Transmission Control Protocol (TCP) packet or a Real-time Transport Protocol (RTP) packet;
    identifying a TCP or RTP sequence number associated with the first data packet; and
    storing the TCP or RTP sequence number associated with the first data packet as a data field within the one or more data fields identifying the characteristics of the plurality of data packets.

14. The method of claim 8, further comprising:
    determining that a first data packet in the received plurality of data packets is a User Datagram Protocol (UDP) packet;
    creating a first hash signature based on the first data packet; and
    storing the first hash signature as a data field within the one or more data fields identifying the characteristics of the plurality of data packets.

15. An apparatus, comprising:
    at least one processor; and
    one or more computer-readable non-transient media storing computer-executable instructions that, when executed by the processor, cause the apparatus to perform:
       receiving data corresponding to a first plurality of data packets associated with a first network element, and data corresponding to a second plurality of data packets associated with a second network element;
       identifying in the first plurality of data packets a first data packet having first identifying information;
       identifying a second data packet, in said second plurality of data packets, having second identifying information corresponding to said first identifying information; and
       performing a network data flow analysis for a network path comprising the first network element and the second network element, wherein performing the network data flow analysis comprises comparing the first identifying information with the second identifying information, and determining that the first data packet and the second data packet correspond to the same data packet at different locations in the network path.

16. The apparatus of claim 15, wherein the first network element corresponds to network data collected downstream of an access modem, and the second network element corresponds to network data collected upstream of the access modem.

17. The apparatus of claim 15, wherein the first data packet and the second data packet are Transmission Control Protocol (TCP) packets or Real-time Transport Protocol (RTP) packets, and wherein determining that the first data packet and the second data packet correspond to the same data packet comprises comparing a packet sequence number from the first data packet to a packet sequence number from the second data packet.

18. The apparatus of claim 15, wherein the first data packet and the second data packet are User Datagram Protocol (UDP) packets, and wherein determining that the first data packet and the second data packet correspond to the same data packet comprises:
    determining a first hash signature associated with a payload of the first data packet;
    determining a second hash signature associated with a payload of the second data packet; and
    comparing the first hash signature and the second hash signature.

19. The method of claim 1, further comprising:
    determining that the data packets within the first and second plurality of data packets belong to a plurality of different application flows, each said application flow corresponding to a specific device or software application,
    wherein performing the network data flow analysis comprises performing separate data flow analyses for each said application flow.

20. The apparatus of claim 15, the computer-readable media further storing computer-executable instructions that, when executed by the processor, cause the apparatus to perform:
    determining that the data packets within the first and second plurality of data packets belong to a plurality of different application flows, each said application flow corresponding to a specific device or software application, wherein performing the network data flow analysis comprises performing separate data flow analyses for each said application flow.

\* \* \* \* \*